(No Model.)

J. GILSON.
Hame Fastener.

No. 241,349.       Patented May 10, 1881.

Witnesses:
E. G. Asmus
J. O. Peck

Inventor:
John Gilson
By Jas. B. Erwin
Attorney

UNITED STATES PATENT OFFICE.

JOHN GILSON, OF PORT WASHINGTON, WISCONSIN, ASSIGNOR OF ONE-HALF TO NICHOLAS GILSON, OF SAME PLACE.

HAME-FASTENER.

SPECIFICATION forming part of Letters Patent No. 241,349, dated May 10, 1881.

Application for filed February 19, 1881. (No model.)

*To all whom it may concern:*

Be it known that I, JOHN GILSON, a citizen of the United States, residing at Port Washington, in the county of Ozaukee and State of Wisconsin, have invented certain new and useful Improvements in Hame-Fasteners; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in hame-fasteners; and it consists in a slotted bar or link adapted to be permanently secured to one hame, and two folding levers hinged or pivoted together at one end and adapted to be permanently secured to the other hame.

Heretofore it has been common to attach one end of hame-fasteners to the respective hames temporarily by snap-hooks, and to attach the other ends to a shell or case within which they were folded and secured by sliding bolts when fastening the hames around the collar.

By my improvement the levers are so formed that they can be coupled and folded and retained together without a case, bolt, or spring, and these elements are dispensed with.

My invention is further explained by reference to the accompanying drawings, in which—

Figure 1:
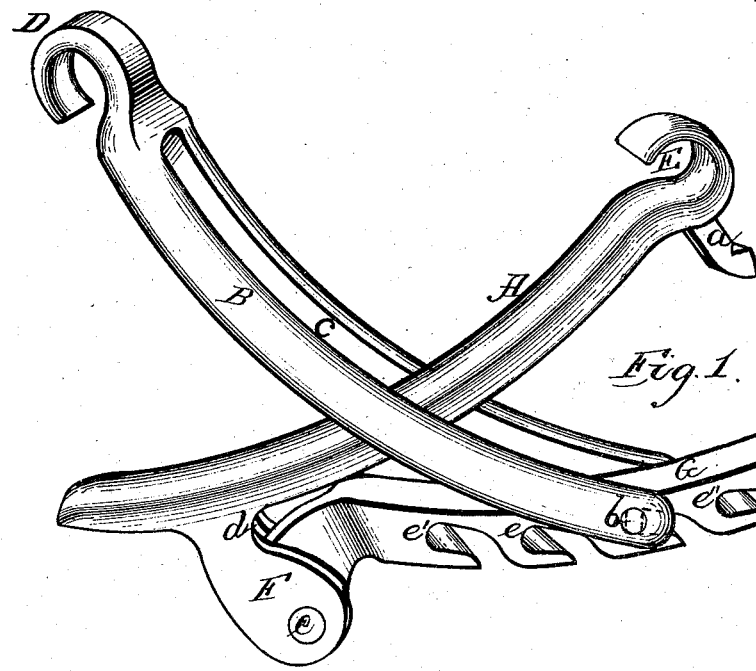
Figure 2:
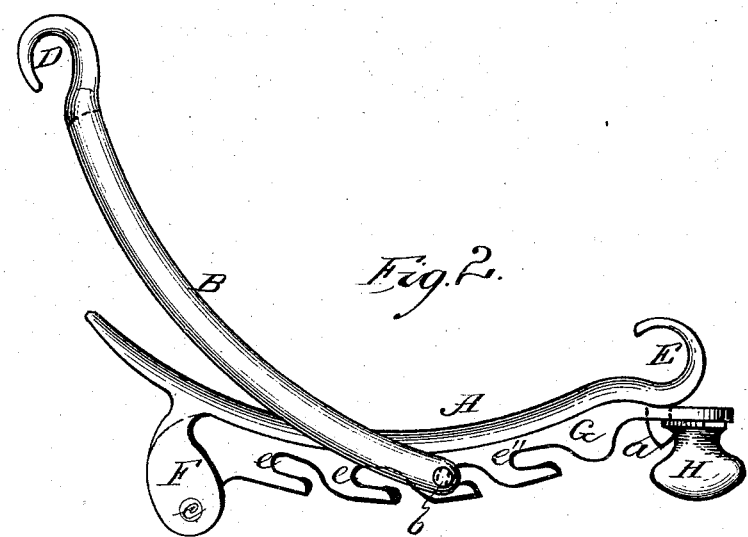

Figure 1 represents a perspective view. Fig. 2 is a side view of the same.

Like parts are represented by the same reference-letters in both views.

The levers A and B are permanently secured to the respective hames, and when removed from the collar they are disconnected from each other and left suspended from the respective hames, to which they are attached independently of each other. The bars A and B are made of malleable iron, and the hooks D and E are respectively closed around the respective hame-rings, thus permanently connecting them with the hames.

G is an adjusting-lever, by which the couplings are adjusted to conform to collars of various sizes, and locked where adjusted around the collar. The lower end of lever G is secured in slot $d$, between lugs F, by pin $c$.

$e$ are adjusting-hooks, which are cast or otherwise formed upon the lower surface of the lever G.

When adjusting the fastener for a large collar the free end of the link B is engaged in the hook nearest to the hinge. For smaller collars it is engaged in the hooks farthest from the hinge. The cross-bar $b$, which forms the end of the link, is flattened upon two of the sides, or is slightly oval, as shown by the dotted lines, and the hooks $e$ are formed in the peculiar curved shape shown, whereby the end of one hook is brought near the base of the next preceding it. By this peculiar shape the mouths of the recesses between the hooks are made narrower than their rear or inner end. The object attained by this form is to retain the end of the link in the recess and prevent it from being accidentally unhooked. The greatest diameter of the pin $b$ is such that it cannot pass through the mouth of the recess. The pin $b$ is so formed that the line of its greatest diameter is brought at right angles to the link, whereby it becomes impossible for the link to become detached from the hooks when the levers are folded together, and they can be inserted and withdrawn only when the levers are unfolded, in which position the pin $b$ is brought edgewise to the mouth of the recess and readily passes through it.

When desirous to secure the hames to the collar the pin $b$ is first engaged in one of the hooks $e$. The levers A and G are then folded, as shown in Fig. 1, and the hinged end inserted through the slot C when lever G is drawn upward closely against lever A, as shown in Fig. 2, whereby the hames are drawn toward each other and secured to the collar. The levers A and G are rigidly locked together in the position shown in Fig. 2 by the catch $a$ and knob H. The lever G is provided with an opening, $a'$, for the reception of the catch $a$. The knob H is attached to the lever G with a pivot, around which it is adapted to be turned. An eccentric flange, $h$, is formed upon one side of the knob, which is adapted to engage in the catch a, whereby the levers A and G may be rigidly locked together.

It is obvious that by turning the knob in one direction the eccentric flange h is caused to engage above the catch a, and that by an inverse movement it is disengaged therefrom.

Having thus described my invention, what I claim as new, and desire to secure by Letters Patent, is—

1. The improvements in hame-fasteners herein described, consisting in the combination of the slotted lever B and oval pin b, as adapted to be retained in hooks e when the levers are folded together, substantially as set forth.

2. The combination of lever A, provided with catch a and lugs F, with lever G, provided with the peculiar-shaped hooks e, projecting from its lower surface, the outward end of one hook being inclined forward toward the base of the preceding hook, and loosely-pivoted knob H, provided with eccentric flange h, as adapted to engage in catch a, all substantially as set forth.

3. The combination of slotted lever B, provided with oval pin b, and hook D, lever A, provided with catch a, and lugs F, lever G, provided with downwardly-inclined hooks e and opening a', loosely-pivoted knob H, provided with eccentric flange h, all substantially as and for the purpose specified.

In testimony whereof I affix my signature in presence of two witnesses.

JOHN GILSON.

Witnesses:
JAMES McCARTHY,
JOHN P. WEYKER.